United States Patent [19]

Riedle et al.

[11] Patent Number: 5,778,172
[45] Date of Patent: Jul. 7, 1998

[54] ENHANCED REAL-TIME TOPOLOGY ANALYSIS SYSTEM OR HIGH SPEED NETWORKS

[75] Inventors: Christopher G. Riedle, Raleigh, N.C.; Paul C. Hershey, Manassas, Va.

[73] Assignee: Lockheed Martin Corporation, Bethesda, Md.

[21] Appl. No.: 635,811

[22] Filed: Apr. 22, 1996

[51] Int. Cl.$^6$ .................................................. G06F 11/30
[52] U.S. Cl. .............................. 395/187.01; 395/200.54
[58] Field of Search ........................ 395/200.66, 187.01, 395/200.54, 200.55, 186

[56] References Cited

U.S. PATENT DOCUMENTS

| | | | |
|---|---|---|---|
| 4,464,733 | 8/1984 | Misker et al. | 395/821 |
| 4,965,763 | 10/1990 | Zamora | 395/751 |
| 5,168,444 | 12/1992 | Cukor et al. | 395/201 |
| 5,289,390 | 2/1994 | Unverrich | 364/562 |
| 5,291,592 | 3/1994 | Kita | 395/615 |
| 5,325,527 | 6/1994 | Cwikowski et al. | 395/200.52 |
| 5,365,513 | 11/1994 | Copley | 370/17 |
| 5,414,833 | 5/1995 | Hershey | 395/187.01 |

*Primary Examiner*—Eric Coleman
*Attorney, Agent, or Firm*—Lane Aitken and McCann

[57] ABSTRACT

The disclosed system allows determination of topological aspects of a high speed data communications network in real time without interfering with the operation of the network. The topographical information determined by the present invention includes the cable length of the network, the cable length between stations on the network, and the station addresses and relative order of stations on the network. The system determines the cable length of the network by dividing the amount of time that a token spends on the cables of the network as it travels completely around the network by the propagation speed per unit length of the cables of the network. The system determines the length of cable between any two adjacent stations on the network by determining the length of time between frames transmitted by the adjacent stations, and dividing this time by the propagation speed per unit length of the cable of the network. Lastly, the system determines the number of stations and the addresses of these stations on the network by extracting source addresses from the pertinent network frames.

2 Claims, 9 Drawing Sheets

ENHANCED REAL-TIME TOPOLOGY ANALYSIS SYSTEM OR HIGH SPEED NETWORKS

BACKGROUND OF THE INVENTION

1. Technical Field

The present invention relates to an improved system for determining, in real time, topological aspects of a high speed data communications network without adversely impacting the operation of the network, and more particularly to a system for determining topological aspects of networks using a token ring protocol.

2. Related Patents and Patent Applications

This patent application is related to U.S. Pat. No. 5,375,070, which issued on Dec. 20, 1994 from application Ser. No. 08/024,572 filed Mar. 1, 1993, entitled "Information Collection Architecture and Method for a Data Communications Network," by J. G. Waclawsky, Paul C. Hershey, Kenneth J. Barker and Charles S. Lingafelt, Sr., assigned to the IBM Corporation and incorporated herein by reference.

This patent application is related to U.S. Pat. No. 5,365,514, which issued on Nov. 15, 1994 from application Ser. No. 08/024,563 filed Mar. 1, 1993, entitled "Event Driven Interface for a System for Monitoring and Controlling a Data Communications Network," by Paul C. Hershey, J. G. Waclawsky, Kenneth J. Barker and Charles S. Lingafelt, Sr., assigned to the IBM Corporation and incorporated herein by reference.

This patent application is related to U.S. Pat. No. 5,493,689, which issued on Feb. 20, 1996 from application Ser. No. 08/024,542 filed Mar. 1, 1993, entitled "System and Method for Configuring an Event Driven Interface and Analyzing Its Output for Monitoring and Controlling a Data Communications Network," by J. G. Waclawsky and Paul C. Hershey, assigned to the IBM Corporation and incorporated herein by reference.

3. Background Art

The topology of a data communications network consists of the physical attributes of the network and includes such things as the number of stations on the network, the network addresses of those stations, the total length of cable throughout the network, and the length of cable between any two stations on the network.

It is advantageous to be able to quickly and easily determine certain topological aspects of a network, such as the total length of cable in the network, for several reasons. First, network protocols limit the total length of cable that can be installed in the network. Second, comparing the total length of cable authorized for network use with the total length of cable actually in use will detect any unauthorized connections to the network. To quickly and easily locate the point of unauthorized use, the actual length of cable between any two stations can be compared with the length of cable authorized for use between the two stations. Furthermore, by being able to easily determine the number of stations on the network and the addresses of those stations, one could determine if any unauthorized stations are connected to the network.

Polling can be employed to determine some of the above identified topological aspects of a network. In polling, a control device sends out a signal to each station connected to the network to determine the status of that station or to determine if that station has any messages to transmit over the network. While polling can be used to determine the presence or absence of stations on the network, it cannot determine the length of cable throughout a network without additional complex software to support such a function. Polling also consumes network resources since its involves the use of special control signals which occupy bandwidth on the network, and it consumes processor time of both the control device and the station that is being polled. Furthermore, polling is not flexible since the control device must be programmed to poll each station in a particular order and to request certain information from the stations. Consequently, if a new station is added to the network, or if different information is desired, a time consuming program change must be implemented.

It is an object of the present invention to passively determine topological aspects of a data communications network.

It is another object of the invention to precisely determine the total length of cable throughout the network.

It is a further object of the invention to precisely determine the total length of cable between any two stations on the network.

It is another object of the invention to identify the number of stations on the network and the addresses of those stations.

It is still another object of the invention to make these determinations in real time.

It is yet a further object of the invention to make these determinations without consuming any network resources.

It is a still further object of the invention to permit a network manager to immediately respond to security breaches on the network.

It is yet a further object of the invention to prevent outages on the network.

SUMMARY OF THE INVENTION

The present invention relates to a system which determines topological aspects of a token ring data communications network including the total length of cable on the network, the length of cable between any two adjacent stations, the number of network stations, and the network addresses of those stations. The system uses the operating frequency of the network, the propagation speed per unit length of the cable of the network, features of the IEEE 802.5 token ring protocol, and an information collection module containing an event driven interface as disclosed in U.S. Pat. No. 5,493,689 to determine these topological aspects.

The system determines the total length of cable in a network by measuring the time that it takes a token to travel around the network, subtracting from that time the time that the token spends in the stations and buffers of the network, and dividing that result by the propagation speed of the cables of the network. In order to insure that a token has travelled unimpeded around the token ring network, the system requires that no frames travel through the station which transmitted the token until the token returns to that station.

To measure the time that it takes a token to travel around the network, the token is transmitted from a station, and the clock reading of the station is recorded. The clock reading is recorded once again upon return of the token. The system subtracts the first clock reading from the second clock reading which results in the number of clock pulses per token rotation. The system multiplies the number of clock pulses per token rotation by the time per clock pulse giving the time per token rotation.

The system determines the propagation delay for a token to pass through a station on a network by multiplying the number of bits that can occur between the time that a token enters a station and the time that the token leaves the station by the time per clock pulse of the station. The time that a token spends in one station is then multiplied by the number of stations on the network to arrive at the total propagation delay time for a token to pass through all the stations on the network as it makes a complete rotation around the network. The event driven interface calculates the number of stations on the network by counting the number of standby monitor present frames that pass through it, and adding one to this count (IEEE 802.5 protocol provides that each station generates a standby monitor present frame approximately once every seven seconds). The time that a token spends in the buffers of the network is an estimated constant, and like the time that a token spends in the stations of the network, it is subtracted from the time that it takes a token to travel completely around the network.

Second, the present invention determines the length of cable between any two adjacent network stations. The event driven interface identifies an active monitor present frame or a standby monitor present frame and records the clock reading. The event driven interface then identifies the next standby monitor present frame, and the system again records the time of the clock. The first clock reading is subtracted from the second clock reading, and then multiplied by the time per clock pulse to arrive at the time between these two frames. From this time the system subtracts the time that it takes a station to generate a notification that it has received a frame. The system then divides this time by the propagation speed of the cable to determine the length of the cable between the station that generated the active monitor present frame (or the first standby present monitor frame) and the station that generated the second standby monitor present frame. To determine the cable length between the active monitor station and its downstream neighbor, the cable length between all other stations is subtracted from the total cable length of the entire network.

Third, the present invention identifies all of the stations on the network, the network addresses of those stations, and the logical order of those stations (i.e. the order of the stations that a token encounters as it travels completely around the token ring network). The system again uses the event driven interface to identify the active monitor present frame and all of the standby monitor present frames which are generated by the stations of the network during a particular seven second interval (as dictated by IEEE 802.5 protocol). When the event driven interface identifies one of these frames, it extracts the source address from that frame and writes it to a database. The source address is the address of the station from which the frame originated. These source addresses are written to the database in the order that the event driven interface receives them thereby maintaining the proper station order.

The system of the present invention possesses several advantages over the prior art process of polling. First, since a token is an integral part of a token ring network according to IEEE 802.5 protocol, the present invention does not consume any bandwidth or other resources of the network. Furthermore, since the system identifies the token with an information collection module, this identification is done in real time. Lastly, the system processes the data obtained by the event driven interface in a processor separate from the network, thereby further avoiding the use of network resources.

DETAILED DESCRIPTION OF THE PREFERRED EMBODIMENTS

A. Basic Structure and Operation of a Token Ring Network

Figure 1:
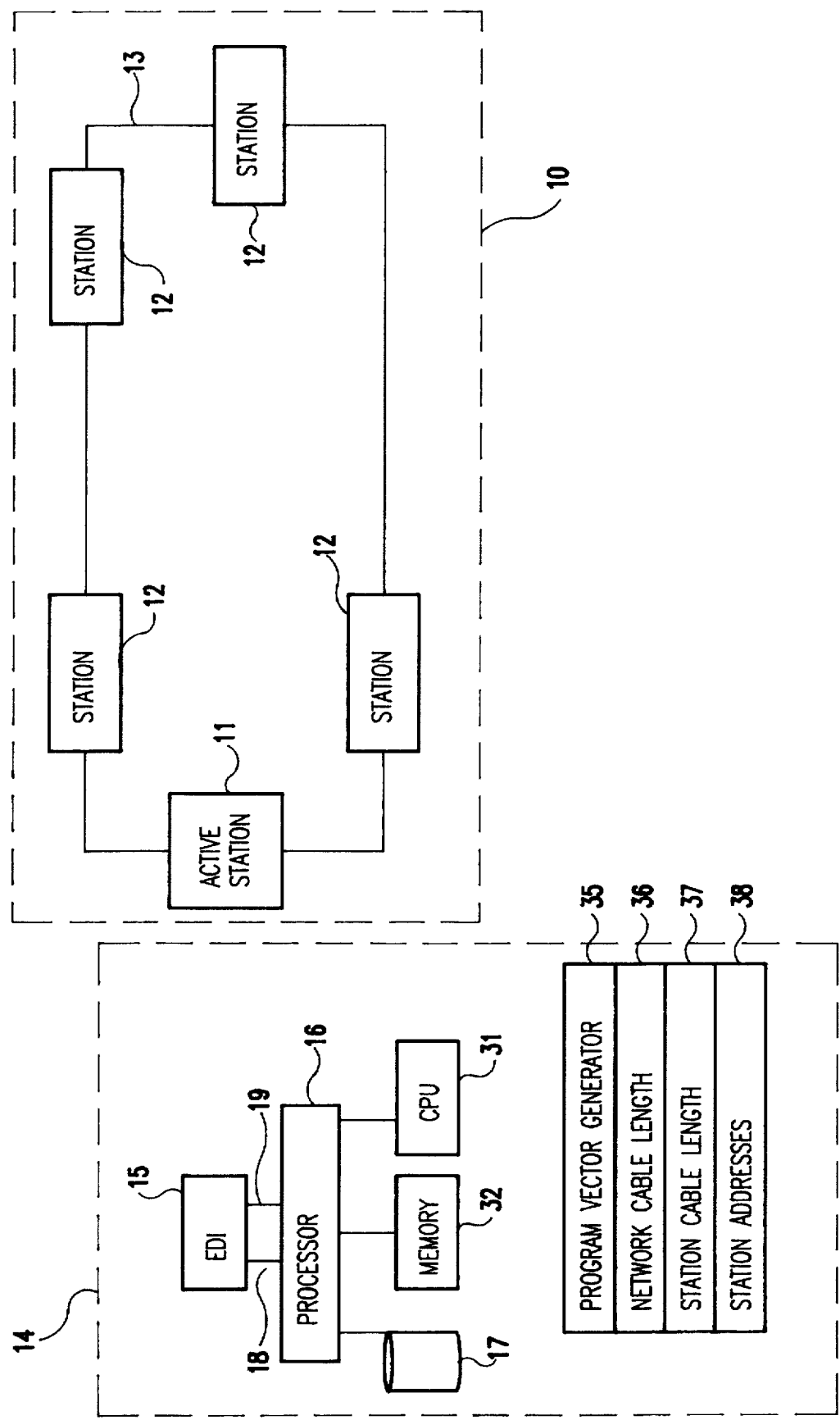
FIG. 1 is a schematic representation of a token ring network upon which the present invention can operate.

A token ring network 10 upon which the system of the present invention can operate is illustrated in FIG. 1. The token ring network 10 consists of an active monitor station 11, one or more standby monitor stations 12, and network cables 13 connecting all of the stations in a ring. The present invention requires that at least one of the stations on the network contains an information collection module 14. In FIG. 1, the information collection module 14 is connected to the active monitor station 11. The information collection module 14 comprises an event driven interface 15, a processor 16, a database 17, a control line 18, an event line 19, a CPU 31 and memory 32. In a preferred embodiment, the information collection module 14 is embodied in a microchannel adapter card and installed in a personal computer system such as an IBM PS/2-model 80.

Figure 2:
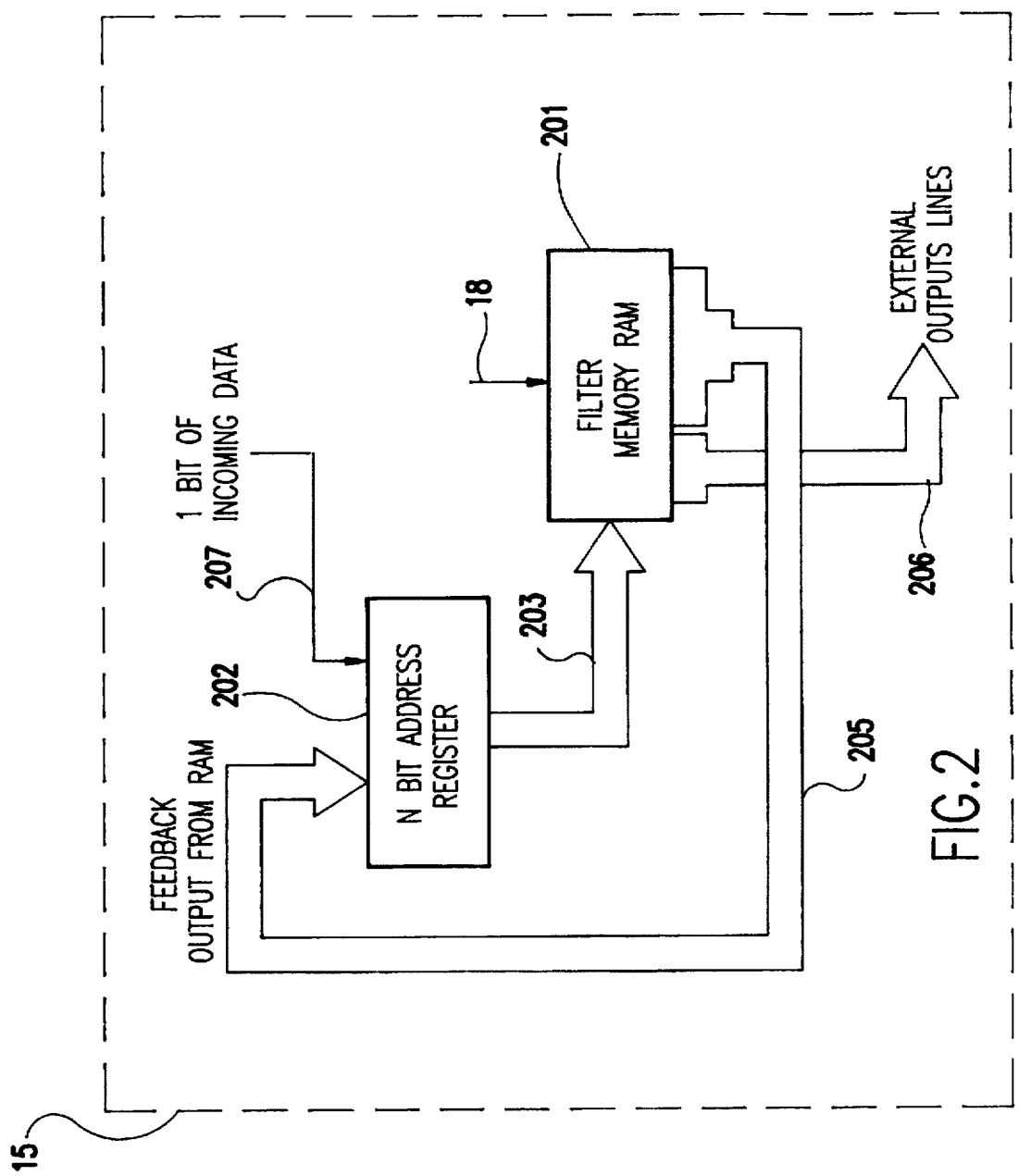
FIG. 2 is a schematic representation of an event driven interface.

The event driven interface 15 is illustrated in more detail in FIG. 2. It comprises a filter random access memory (RAM) 201 and an N bit register 202. The event driven interface 15 uses the output of register 202 to address the filter RAM 201 via line 203. The least significant bits of the filter RAM 201 serve as input to the address register 202 via line 205. The input for the least significant bit of the register 202 originates from the token ring network over line 207. The output of the filter RAM 201 and the single bit from the network 10 are concatenated to form the next address to be accessed in the filter RAM 201. The bits in a particular memory location in the filter RAM 201 that are not output to register 202 can be used as external outputs (i.e. event vectors E(i)) to update counters in the event driven interface 15, or the external outputs can be output directly to the processor 16 via line 19. The operation of the event driven interface 15 in relation to the system of the present invention will be explained in detail later in the specification.

The event driven interface 15 is a versatile, reprogrammable low cost digital filter contained within an integrated circuit chip, and it is capable of incrementing counters within it in one clock cycle which allows the present invention to operate in real time (i. e. at network speed). It performs filtering of the incoming data based on multiple user defined patterns stored within it. The processor 16 configures the event driven interface 15 by sending control vectors C(i) to the event driven interface 15 over line 18.

These control vectors C(i) are stored in the filter RAM 201. The control vectors C(i) configure the event driven interface 15 to identify particular types of MAC frames which are transmitted over the token ring network 10. A MAC frame is used for token ring maintenance and/or token ring management. The system utilizes the number of these frames, the amount of time it takes for these frames to travel over the network, and the information contained within these frames to determine topological characteristics of the token ring network 10.

The contents of the counters in the event driven interface 15 are sent back to the processor 16 as event counts E(i) over line 19. The processor 16 performs calculations on these event counts E(i) separate from the operation of the token ring network 10 thereby imposing no load on the network. Alternatively, the information extracted by the event driven interface 15 can be immediately sent back as an event vector E(i) to the processor 16 over line 19 without first being stored in the counters of the event driven interface 15. Since the system uses a processor other than a processor used by the network, the operation of the network is not affected.

The processor 16 is further comprised of a CPU 31 and memory 32. The memory 32 stores programs that are executed in the CPU 31. Programs that are stored in the memory 32 include the control vector generator module 35, the network cable length module 36, the station cable length module 37, and the station address storage module 38. The control vector generator module 35 generates the data which configures the event driven interface 15 to identify certain types of frames. In one embodiment, the control vector generator module 35 uses a data file containing predefined control vectors that the control vector generator module 35 downloads to the event driven interface 15. In another embodiment, the control vector generator module 35 executes a filter pattern consolidation method that is described in detail in U.S. Pat. No. 5,493,689. The cable length calculator modules 36 and 37 and the station address storage module 38 interpret and analyze the event vectors E(i) sent to the processor 16 by the event driven interface 15.

Figure 3:
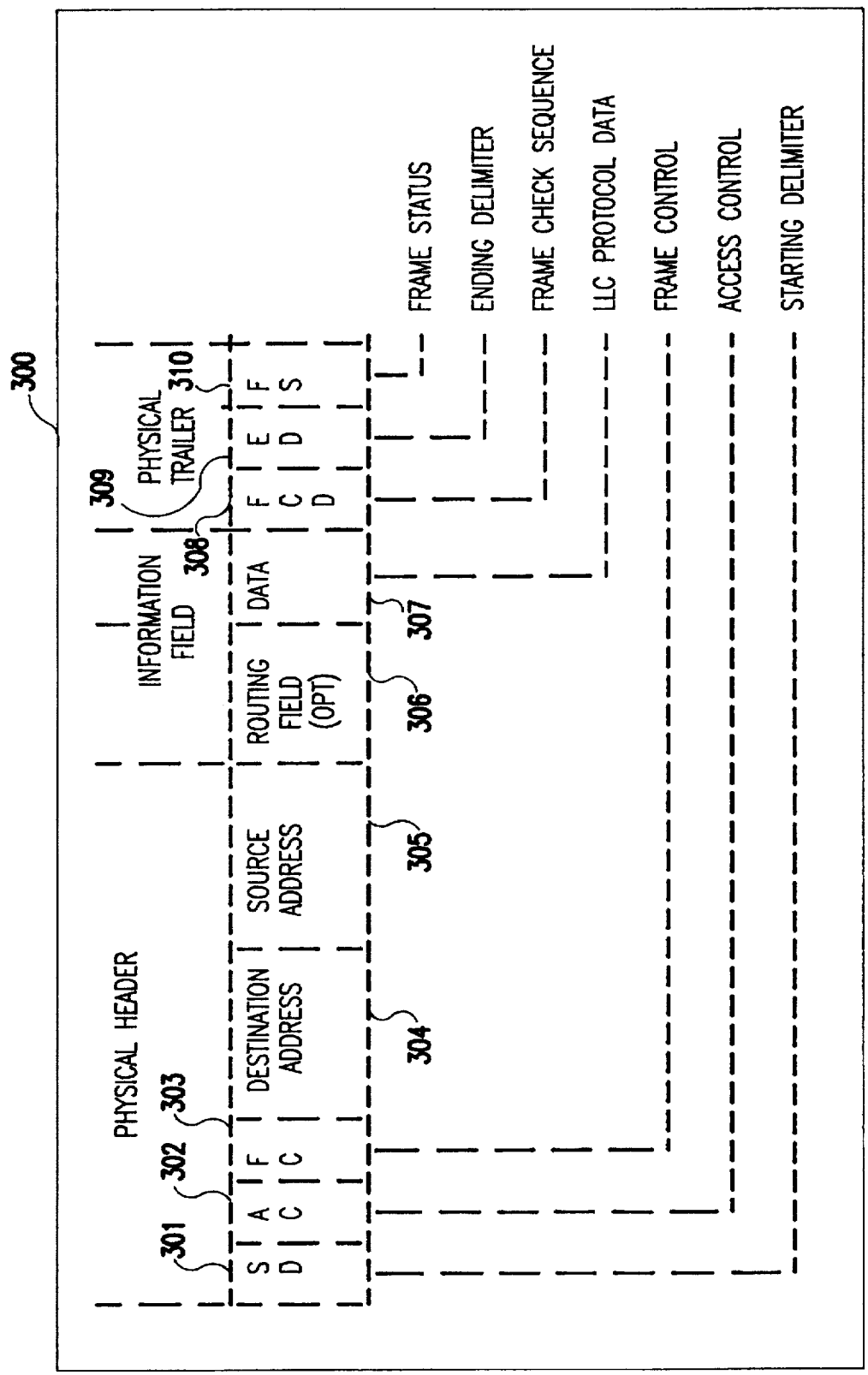
FIG. 3 is an illustration of the format of an IEEE 802.5 token ring frame.
Figure 4:
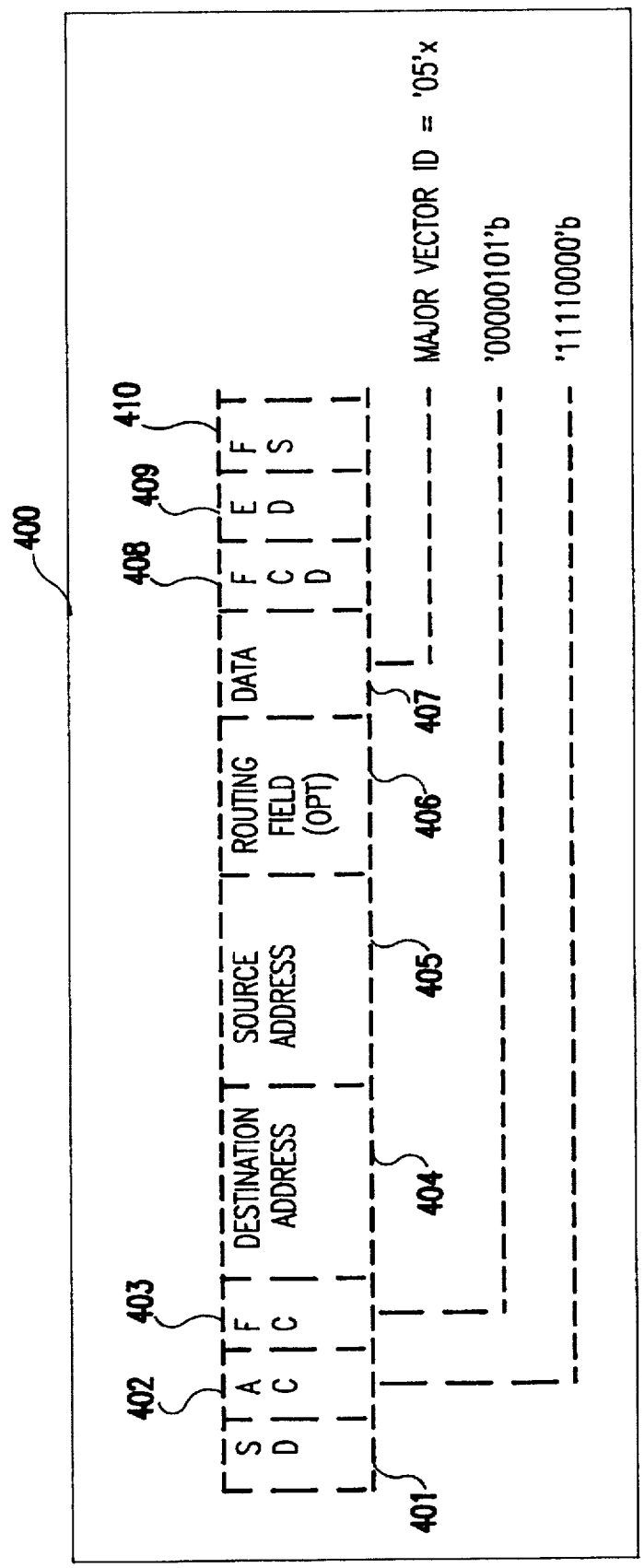
FIG. 4 is an illustration of the format of an IEEE 802.5 active monitor present frame.
Figure 5:
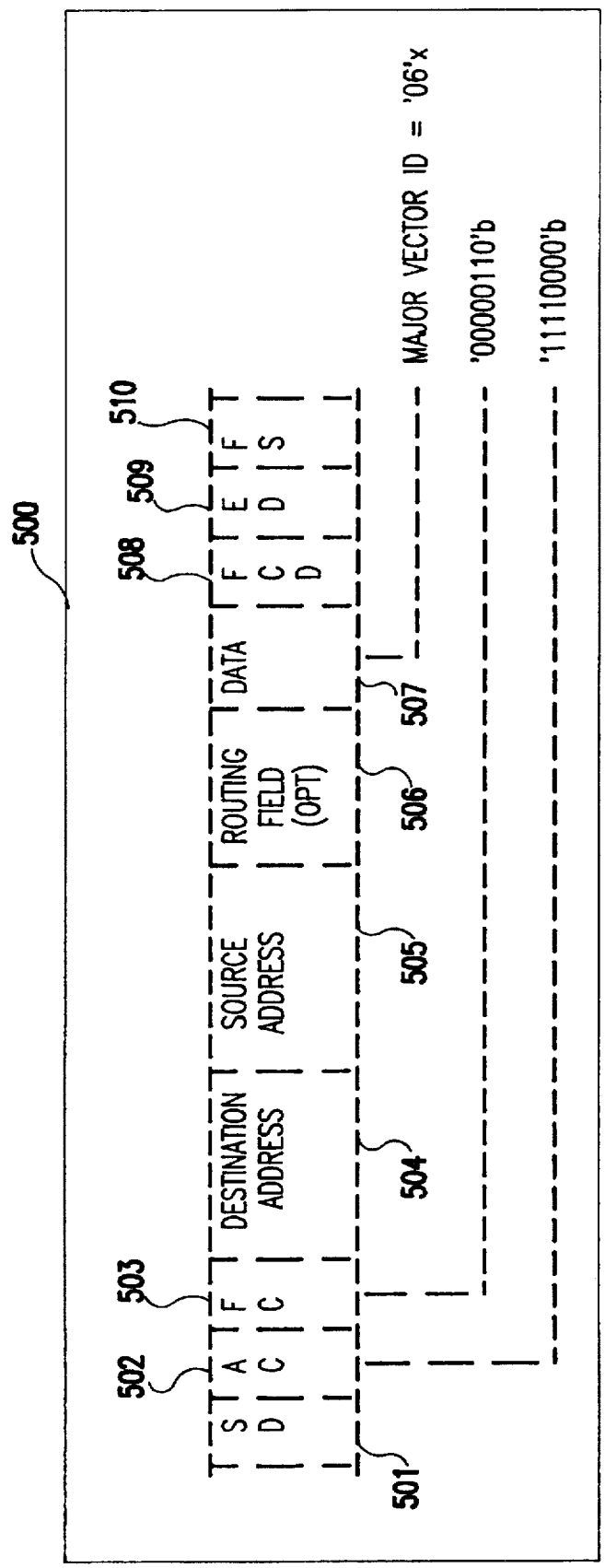
FIG. 5 is an illustration of the format of an IEEE 802.5 standby monitor present frame.

IEEE 802.5 protocol requires that the stations of the token ring network 10 transmit MAC frames every seven seconds. The system uses these MAC frames to implement the present invention, thus imposing no load on the network. The particular MAC frames used by the system of the present invention are active monitor present frames and standby monitor present frames. A general frame format 300 is illustrated in FIG. 3, and the frame formats of an active monitor present frame 400 and a standby monitor present frame 500 are illustrated in FIGS. 4 and 5 respectively. A general frame 300 contains the fields of starting delimiter 301, access control 302, frame control 303, destination address 304, source address 305, routing information 306, data field 307, frame check field 308, end delimiter field 309, and frame status field 310. The active monitor present frame 400 and the standby monitor present frame 500 contain identical fields as illustrated in FIGS. 4 and 5. Under IEEE 802.5 protocol, the active monitor station 11 of the token ring network 10 transmits an active monitor present frame 400 every seven seconds, and the standby monitor stations on the token ring network 10 transmit a standby monitor present frame 500 in response to receiving the active monitor present frame 400. This results in each standby monitor station transmitting a standby monitor frame every seven seconds.

B. Determination of Network Cable Length

Figure 6:
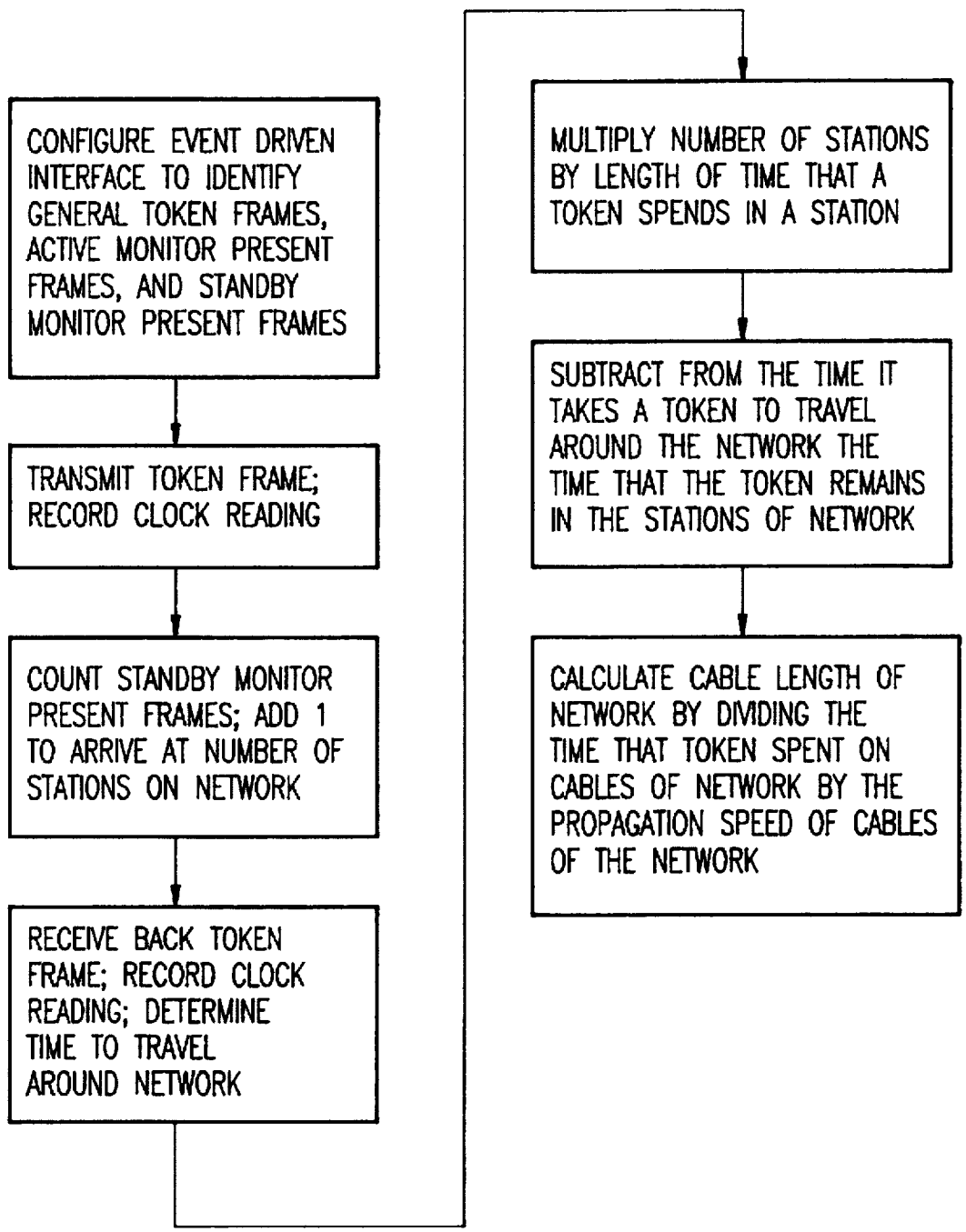
FIG. 6 is a flowchart of the steps that the present invention uses to determine the network cable length.

FIG. 6 illustrates the steps carried out by the system of the present invention to determine the total cable length of the token ring network 10 in real time (i.e. network speed) without interfering with the operation of the network. The system calculates the total cable length of the network by dividing the time that a token spends on the cables of the token ring network 10 by the propagation speed per unit length of the cables 13 of the token ring network 10.

The system executes several steps to calculate the time that a token spends on the cables 13 of the token ring network 10. The station that has attached to it the information collection module 14 (normally the active monitor station 11) transmits a token around the token ring network 10. The system records the clock reading of the station at the time that it transmits this token. The station, using the event driven interface 15, subsequently identifies that same token when this token returns back to the station, and records the clock reading for a second time. The inventions requires that no other frames travel through the station before the token returns back to the station. This requirement insures that the token was not captured by another station and converted to a data frame. The first clock reading is subtracted from the second clock reading to give the number of clock pulses that were generated as the token traveled around the network 10. The system calculates the time that it took the token to travel around the token ring network 10 by multiplying the time per clock pulse by the number of clock pulses generated while the token traveled around the token ring network 10.

The system next calculates the length of time that a token spends on the cables of the token ring network 10 by subtracting from the time that it takes a token to travel completely around the token ring network 10 the time that a token spends in the buffers and stations of the token ring network 10. The system then divides the time that a token spends on the cables of the network 10 by the propagation speed of the cables 13 to acquire the cable length of the network 10. This calculation, in equation form, is:

NETWORK CABLE LENGTH =
(TIME FOR TOKEN TO TRAVEL AROUND NETWORK −
TIME TOKEN REMAINS IN NETWORK BUFFERS −
(TIME TOKEN SPENDS IN A STATION * NO. OF STATIONS))/
(PROPAGATION SPEED PER UNIT LENGTH OF CABLE)

The system calculates the amount of time that a token remains in a station of the token ring network 10 by multiplying the number of bits that can occur between the time that a token enters a station and the time that the token leaves the station by the time per clock pulse of the station. This calculation gives a worst case scenario of the time that a token will spend in a station of the network as it travels around the network.

After determining the amount of time that a token will remain in a station as it travels through the token ring network 10, the system must determine the number of stations on the token ring network 10. The system uses the active monitor present frames 400 and standby monitor frames 500 of the IEEE 802.5 protocol to determine the number of stations on the token ring network 10. With the event driven interface 15 configured to identify the active monitor present frames 400 and the standby monitor present frames 500 as they pass through the station containing the event driven interface 15, the event driven interface 15 counts the number of standby monitor present frames 500 between any two active monitor present frames 400, and it returns this count to the processor 16. By adding one to this count (for the active monitor station that sends out an active monitor present frame in lieu of a standby monitor present frame), the system determines the number of stations on the network. The system then multiplies the number of stations by the time that a token will spend in a station as it makes its complete trip around the token ring network 10. The system subtracts this value plus the amount of time that each token spends in the buffers (a constant equal to 64 times the time per clock pulse) of the token ring network 10 from the amount of time it takes the token to travel completely around the network to arrive at the time that a token spends on the cables 13 of the token ring network 10.

The system configures the event driven interface 15 to identify the active monitor present frames 400 and standby monitor present frames 500. The event driven interface 15 compares the incoming data from the token ring network 10 with the user defined filter patterns embodied in the control vectors C(i) that are stored in the filter RAM 201. The event driven interface 15 filters this data in real time as the data bits which make up these frames travel through it.

Figure 7:
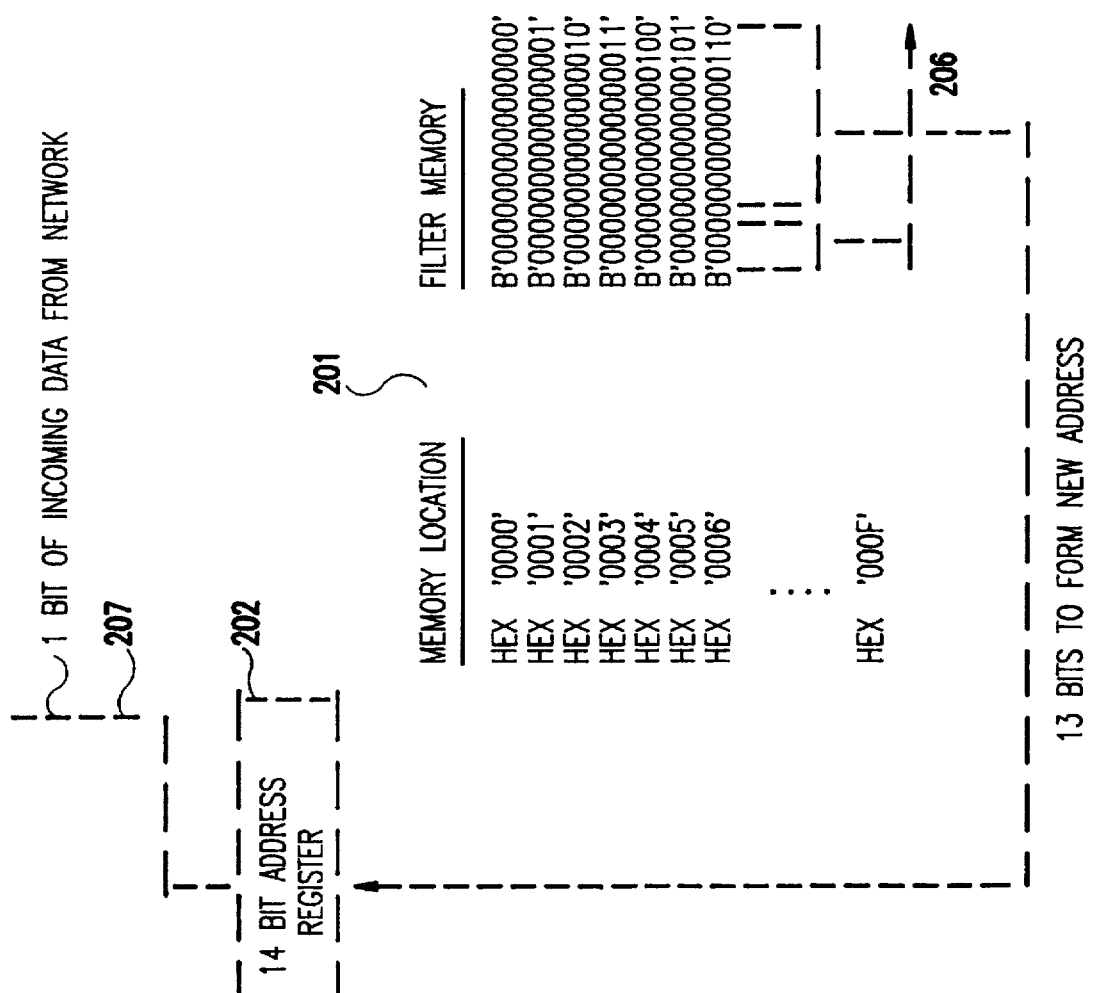
FIG. 7 is an illustration of the manner in which the event driven interface filters network data.

FIG. 7 illustrates the manner in which the configured filter RAM 201 identifies the active monitor present frames 400 and the standby monitor present frames 500. A standby monitor present frame 500 is identified by a B'00000110' in the frame control field 503 (FIG. 5). After the bits of the starting delimiter field 501 and the access control field 502 pass through the event driven interface 15, the event driven interface 15 identifies the standby monitor frame 500 and updates the proper counter, or transmits this information to the processor 16.

This process begins with the address register 202 containing all zeros. The first and most significant bit of the B'00000110' string, i.e. a B'0', comes into the address register 202 from the token ring network 10 and is concatenated with the other 13 bits in the register. The incoming bit is made the least significant bit. After this concatenation, the address register 202 still has all zeros in it, and this is used to address the filter RAM 201 at memory location HEX '0000'. Memory location Hex '0000' contains the value B'0000000000000000', and the most significant 13 bits of this value are transferred to the address register 202 to form the next address. Since the first five bits of the incoming string B'00000110' are B'0', this pattern repeats itself for those bits.

When the sixth bit of the frame control field 503, I. e. a B'1', enters the event driven interface 15 from the token ring network 10, it is made the least significant bit of the address register 202. This forms the address Hex '0001', and Hex '0001' is addressed in the filter RAM 201. The thirteen least significant bits of filter memory Hex '0001', I. e. B'0000000000001', are used to form the next address in the address register 202. The next incoming bit, I. e. a B'1', from the network is concatenated to this as the least significant bit to form the next address B'00000000000011', or Hex '0003'. The thirteen most significant bits from filter memory location Hex '0003' are transferred to the address register 202, and the next incoming bit B'0' from the network forms the next address. The address formed is Hex '0006', and this memory location is then accessed in the filter RAM 201.

As explained above, the control vector generator module 35 configured the filter RAM 201 to identify active monitor present frames 400 and standby monitor present frames 500. This configuration also involves identifying which filter RAM 201 memory locations identify the active monitor frames 400 and the standby monitor frames 500. In this example, memory location Hex '0006' signals the end of the process for a standby monitor present frame 500 by containing non-zero bit values in the most significant bit locations (i. e. the bits other than the bits to which the network bit is added to address the filter memory). See FIG. 7. In this case, the event driven interface 15 either increments the counter for the standby monitor present frame 500 or sends this information to the processor 16 via line 206 in the event driven interface 15 and then line 19. FIG. 7 further illustrates that if an active monitor present frame entered the event driven interface 15, memory location Hex '00051' would have been accessed to identify that type of frame.

When frames pass through the event driven interface 15 which have different bit patterns in the frame control field 303 than either an active monitor present frame 400 or a standby present monitor frame 500, no memory location in the filter RAM 201 is accessed which has non-zero bit values in the most significant bits. The reason for this is that the event driven interface 15 was not configured to recognized these frames (i. e. the most significant bits of the filter RAM 201 for these frames contain all zeros). Consequently, the counters of the event driven interface 15 are not incremented nor is any information sent back to the processor 16.

C. Station Cable Length

Figure 8:
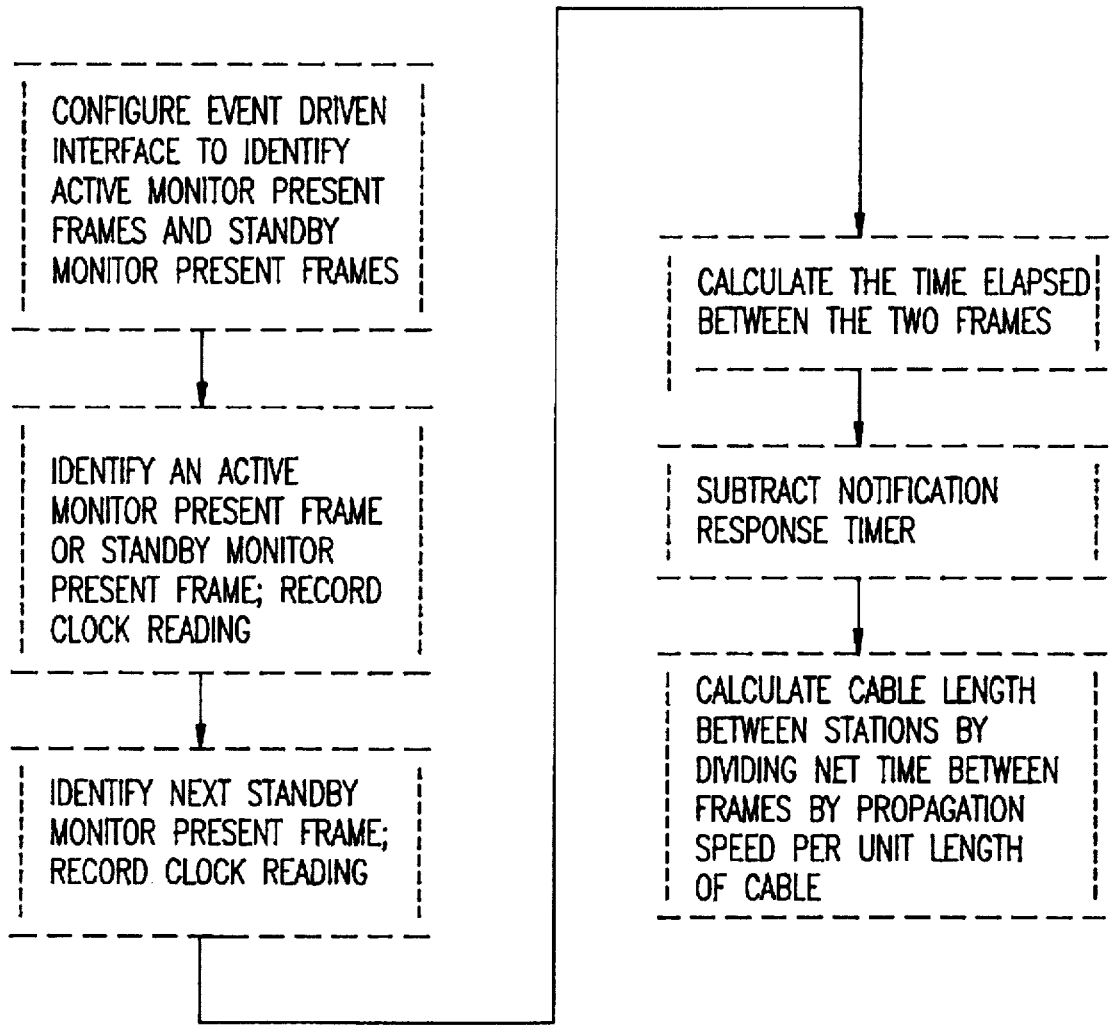
FIG. 8 is a flowchart of the steps that the present invention uses to determine the station to station cable length.

FIG. 8 illustrates the steps that are carried out by the present invention to determine the cable length between two adjacent stations on the token ring network 10. The system calculates the cable length between two adjacent stations by dividing the amount of time that elapses between an active monitor present frame 400 or a standby monitor present frame 500 transmitted by one station, and the standby monitor present frame 500 transmitted by the upstream neighbor of the first station, by the propagation speed per unit length of the network cable 13.

As with the embodiment of the invention which calculates the cable length for the entire network, the processor 16 transmits control vectors C(i) to the event driven interface 15 which configure the event driven interface 15 to identify active monitor present frames 400 and standby monitor present frames 500. Upon identifying such frames, the most significant bits of the filter RAM location 201 which identifies the active monitor present frame 400 or the standby monitor present frame 500 are sent over line 206 and then line 19 to initiate a counter in the event driven interface 15 or the processor 16. This counter tabulates the number of clock cycles which elapse until the event driven interface 15 identifies the next standby monitor present frame 500. Upon identifying the next standby monitor present frame 500, the most significant bits of the filter RAM 201 which identifies this standby monitor present frame 400 will be output over lines 206 and 19 to terminate the counter. The station cable length module 36 multiplies the number of clock pulses generated during the time it took the event driven interface 15 to identify both frames by the time per clock pulse to arrive at the amount of time separating these two frames.

The station cable length module 36 subtracts from this time the notification response timer. The notification response timer records the amount of time that it takes a station to generate a standby monitor present frame 500 in response to receiving a frame from another station. It represents the amount of time that the standby monitor present frame 500 is not on the cables of the network for which the system must therefore compensate. After subtracting the notification response timer, the station cable length module 36 divides this result by the propagation speed per unit length of cable to arrive at the length of cable between the station which generated the first frame and its upstream neighbor which generated the second frame. This calculation, in equation form, is:

CABLE LENGTH BETWEEN STATIONS =
(TIME BETWEEN AN ACTIVE MONITOR PRESENT FRAME OR A
STANDBY MONITOR PRESENT FRAME AND THE NEXT
STANDBY MONITOR PRESENT FRAME –
NOTIFICATION RESPONSE TIMER)/
(PROPAGATION SPEED PER UNIT LENGTH OF CABLE)

The station cable length module 36 determines the cable length between the active monitor station 11 and its nearest downstream neighbor by subtracting the sum of all of the other station to station cable lengths from the total cable length of the token ring network 10. The station length cable module 36 cannot use the above-listed formula to determine the length of this section of cable since the active monitor station 11 does not have a notification response timer, and hence no value would be available for this variable in the formula.

D. Identifying Station Addresses and Relative Station Order on the Network

Figure 9:
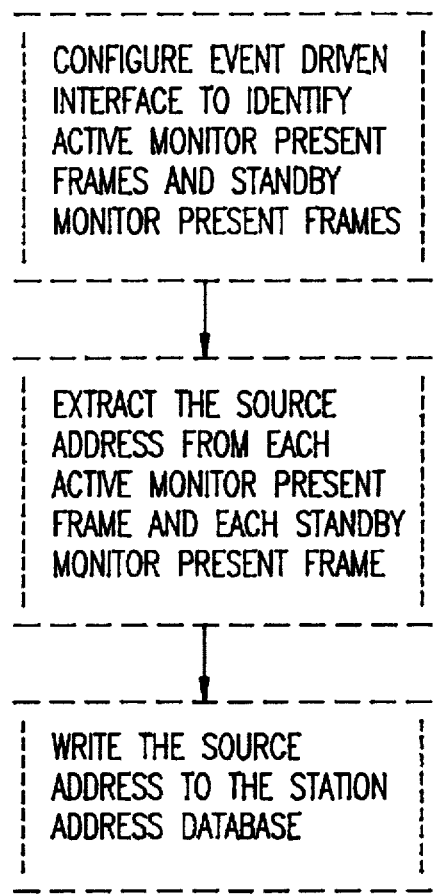
FIG. 9 is a flowchart of the steps employed to determine the number of stations on a token ring network and the addresses of those stations.

FIG. 9 illustrates the steps carried out by the system of the present invention to identify the addresses of stations on the token ring network 10 and the logical order of those stations. FIGS. 4 and 5 illustrate that the active monitor present frame 400 and the standby monitor present frame 500 each contain a field 404 and 504 respectively that contains the source address of that particular frame. The source address identifies the station from which the particular frame originated.

The control vector generator module 35 configures the event driven interface 15 to identify the active monitor present frames 400 and the standby monitor present frames 500 as described above in relation to the other embodiments of the invention. After identifying these frames, the event driven interface 15 extracts the source address from the frame.

The station address storage module 38 stores the source address in the station address database 17. The station address storage module 38 writes the source addresses to the database in the order it receives them from the event driven interface 15 so that the database not only maintains the list of station addresses, but also the logical order of those stations.

Since an active monitor present frame 400 and standby monitor present frames 500 are transmitted every seven seconds, the database is refreshed every seven seconds thereby adding, changing and deleting stations every seven seconds. The database consequently contains a virtual real time listing of the stations on the token ring network 10.

While the invention has been described in terms of the aforementioned embodiments, those skilled in the art will recognize that the invention can be practiced with modification within the spirit and scope of the appended claims.

Claims:

1. A method for determining the total length of cable on a token ring network, said token ring network periodically transmitting a token which, on an as needed basis, is captured by a station on said network in order for said station to transmit data on said network, comprising the steps of:

determining the length of time that said token spends on the cables of said token ring network as said token makes a complete rotation around said token ring network;

calculating said length of time that said token spends on the cables of said token ring network as a function of the propagation speed per unit length of cable of said token ring network; and determining the presence of a security breach on said network by comparing said cable length with the authorized length of cable on said network.

2. A method for determining the length of cable between any two adjacent stations on a token ring network, said token ring network having at least one station with an event driven interface, comprising the steps of:

configuring said event driven interface to identify active monitor present frames and standby monitor present frames by loading bit patterns into said event driven interface which correspond to said active monitor present frames and said standby monitor present frames;

using said event driven interface to identify an active monitor present frame or a first standby monitor present frame transmitted from a first station;

recording a first clock reading of said station having said event driven interface after said station identifies said active monitor present frame or said first standby monitor present frame;

using said event driven interface to identify a next standby monitor present frame transmitted from a second station, said second station located adjacent to said first station;

recording a second clock reading of said station having said event driven interface after said station identifies said next standby monitor present frame;

determining the length of time between said active monitor present frame or said first standby monitor present frame and said next standby monitor present frame by multiplying the difference in said first and second clock readings by the time per clock pulse of said network giving a first result;

subtracting from said first result the length of time required to generate a notification response giving a second result;

dividing said second result by the propagation speed per unit length of cable of said token ring network giving the cable length between said first station, and said second station; and determining the presence of a security breach on said network by comparing said cable length between said two adjacent stations with the authorized length of cable between said two adjacent stations.

* * * * *